(12) United States Patent
Brochard et al.

(10) Patent No.: US 9,180,975 B2
(45) Date of Patent: Nov. 10, 2015

(54) FLEXIBLE LINKING DEVICE FOR AN AIRCRAFT PROPULSION SYSTEM

(71) Applicant: Airbus Operations (SAS), Toulouse (FR)

(72) Inventors: Wolfgang Brochard, Toulouse (FR); Romain Terral, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 142 days.

(21) Appl. No.: 14/140,515

(22) Filed: Dec. 25, 2013

(65) Prior Publication Data

US 2014/0183298 A1 Jul. 3, 2014

(30) Foreign Application Priority Data

Dec. 28, 2012 (FR) ...................................... 12 62950

(51) Int. Cl.
*B64D 27/26* (2006.01)
*F16F 1/50* (2006.01)

(52) U.S. Cl.
CPC .. *B64D 27/26* (2013.01); *F16F 1/50* (2013.01)

(58) Field of Classification Search
CPC .. B64D 27/26; B64D 27/10; B64D 2027/262; B64D 2027/268
USPC ................ 244/54; 248/554–557; 60/796, 797
See application file for complete search history.

(56) References Cited

U.S. PATENT DOCUMENTS

| 2003/0025033 | A1* | 2/2003 | Levert et al. ..................... 244/54 |
| 2008/0230675 | A1* | 9/2008 | Audart-Noel et al. ......... 248/554 |
| 2009/0032673 | A1* | 2/2009 | Dron et al. ..................... 248/557 |
| 2011/0114786 | A1* | 5/2011 | Guillet et al. .................... 244/54 |
| 2012/0018576 | A1* | 1/2012 | Bonnet et al. .................... 244/54 |
| 2013/0302157 | A1* | 11/2013 | Sandy et al. ............... 415/213.1 |
| 2014/0084129 | A1* | 3/2014 | Sandy ............................ 248/554 |

FOREIGN PATENT DOCUMENTS

| EP | 1982915 | 10/2008 |
| EP | 2008933 | 12/2008 |
| EP | 2410202 | 1/2012 |
| WO | 2005025909 | 3/2005 |

OTHER PUBLICATIONS

French Search Report, Sep. 11, 2013.

* cited by examiner

*Primary Examiner* — Christopher P Ellis
*Assistant Examiner* — Richard G Davis
(74) *Attorney, Agent, or Firm* — Greer, Burns & Crain Ltd.

(57) ABSTRACT

A linking device including two hinge pins and having flexibility allowing vibrations between these two shafts to be filtered. The device includes a stack of plates connected to one another by layers of elastomer material. Plates of a first type are coupled to one of the shafts in relation to the movements parallel to the plates, while the plates of a second type are coupled to the other shaft in relation to the movements parallel to the plates, so as to allow relative movement of the shafts parallel to the plates. This linking device may be used in particular as a connecting rod, spreader beam or three-point shackle used in connecting a turbine engine to a pylon in a propulsion system of an aircraft such as an airplane.

11 Claims, 9 Drawing Sheets

FLEXIBLE LINKING DEVICE FOR AN AIRCRAFT PROPULSION SYSTEM

CROSS-REFERENCES TO RELATED APPLICATIONS

This application claims the benefit of the French patent application No. 1262950 filed on Dec. 28, 2012, the entire disclosures of which are incorporated herein by way of reference.

BACKGROUND OF THE INVENTION

The present invention relates to a linking device including at least two shafts intended for the reciprocal articulation of two elements, and allowing filtering of vibrations between the two shafts.

The proposed linking device is intended in particular for aircraft engine attachments.

This device is intended, for example, to form a connecting rod, or a three-point shackle, or again a spreader beam for transferring thrust forces, to connect a turbine engine to a pylon, also called an EMS (Engine Mounting System). Generally speaking, such a pylon allows an engine to be suspended beneath the wing surface of an aircraft, or allows this engine to be mounted above this same wing surface or, again, allows this engine to be mounted on an aft portion of an aircraft's fuselage.

The proposed linking device is not limited to an application in the aeronautics field, and may be used for connecting two elements in any other type of application.

The invention also relates to a propulsion system for an aircraft including at least one linking device of this type, together with an aircraft fitted with at least one such propulsion system.

Airplanes' turbine engines are habitually attached to the wing surface or fuselage by means of a pylon to which the turbine engine is connected through engine attachments and thrust force transfer connecting rods.

FIG. 1 illustrates an example of a propulsion system 8, of the type intended to be attached laterally to an aft portion of an airplane fuselage. This propulsion system 8 includes a turbine engine 10, for example of the type having an unshrouded fan positioned at the aft, commonly called an open rotor pusher, and a pylon 12, which is partially visible, to which the turbine engine is connected. The fans, the nacelle and the air inlet of turbine engine 10 are not represented in FIG. 1, such that only the main structural casings of the turbine engine may be seen. Turbine engine 10 has a longitudinal shaft 11.

Turbine engine 10 is attached to pylon 12 mainly by a forward engine attachment 14, an aft engine attachment 16, and two thrust force transfer connecting rods 18, only one of which may be seen in FIG. 1.

FIG. 2 illustrates forward engine attachment 14 at a larger scale, together with the connection of connecting rods 18 to a rigid structure of pylon 12.

Forward engine attachment 14 includes a bracket 20 attached to pylon 12, to which a connecting rod 22 and a three-point shackle 24, also called a boomerang shackle, are connected. Connecting rod 22 is connected to bracket 20 by means of a first shaft, and is intended to he connected to turbine engine 10 by means of a second shaft. Shackle 24 is connected to bracket 20 by means of two shafts, and is intended to be connected to turbine engine 10 by means of a third shaft. The shafts of connecting rod 22 and of shackle 24 extend in parallel to longitudinal shaft 11 of the turbine engine which may be seen in FIG. 1. Finally, each of thrust force transfer connecting rods 18 is connected to a spreader beam 26, which is itself connected to bracket 20 by means of two shafts. It should be noted that the shafts of the elements described above are not represented in FIG. 2 for reasons of clarity.

However, connecting turbine engine 10 to pylon 20 by means of the elements described above causes vibrations of the turbine engine to be transferred to pylon 12.

This is particularly disadvantageous in the case of propulsion systems attached to the fuselage, as described above, since the vibrations are in that case transmitted directly to the structure of the airplane's fuselage. These vibrations are thus likely to increase wear and tear of the structure of the fuselage, and to impair the passengers' comfort.

Propulsion systems attached above or beneath the wing surface of airplanes generally include an engine attachments and thrust force transfer connecting rods configuration which is comparable to the one described above.

In these latter propulsion systems the vibrations caused by the turbine engines are in theory damped by the flexibility of the wing surface.

However, when the intensity of these vibrations is particularly high, notably in the event of a turbine engine operating incident, the vibrations of this turbine engine may also be transmitted to the structure of the airplane's fuselage.

SUMMARY OF THE INVENTION

One object of the invention is thus a linking device having a certain flexibility, and enabling two elements to be connected by means of shafts.

One particular object of the invention is a linking device able to connect a turbine engine to a propulsion system pylon for an aircraft, whilst filtering at least part of the vibrations caused by the turbine engine.

One object of the invention is notably a linking device which is able to act as a connecting rod, or as a three-point shackle, or again as a spreader beam, in an aircraft propulsion system.

To this end the invention proposes a linking device including:

at least one first connecting unit including a first shaft;

at least one second connecting unit including a second shaft extending in parallel to said first shaft; and connection means for connecting said connecting units to one another.

According to the invention:

said connection means include a stack of layers of elastomer material and of plates made of a more rigid material placed in alternating fashion, such that each layer of elastomer material adheres to two consecutive plates of said stack, wherein said plates extend in parallel to one another;

said layers of elastomer material and said plates include respective first apertures through which said first connecting unit extends, and respective second apertures, through which said second connecting unit extends;

the projection of the first aperture of each layer of elastomer material, in the direction of said first shaft, fully encapsulates said first aperture of each of said plates;

the projection of the second aperture of each layer of elastomer material, in the direction of said second shaft, fully encapsulates said second aperture of each of said plates;

said plates include plates of two distinct types, positioned in alternating fashion;

said first aperture of each plate of a first of the two said distinct types is shaped such that said first connecting unit traverses this aperture without any play;

said second aperture of each plate of a second of the two said distinct types is shaped such that said second connecting unit traverses this aperture without any play;

the section of said respective first apertures of the plates of the second type is widened compared to the section of the respective first apertures of the plates of the first type, and the section of said respective second apertures of the plates of the first type is widened compared to the section of the respective second apertures of the plates of the second type, such that said first and second shafts can move relative to one another, in parallel to said plates, by means of a shearing deformation of said layers of elastomer material.

The term "widened section" is understood to mean that the projection of the first aperture of each plate of the second type, in the direction of the first shaft, encapsulates the whole of the first aperture of each plate of the first type, in a manner such that at least a portion of the perimeter of said projection extends at a distance from the perimeter of the first aperture of each plate of the first type. Similarly, the projection of the second aperture of each plate of the first type, in the direction of the second shaft, encapsulates the whole of the second aperture of each plate of the second type, in a manner such that at least a portion of the perimeter of said projection extends at a distance from the perimeter of the second aperture of each plate of the second type.

The layers of elastomer material provide the cohesion of the entire device. Due to their capacity for elastic deformation, these layers of elastomer material allow relative movement of the shafts, and exert a return force urging each of the shafts towards a neutral position corresponding to a non-deformed state of these layers of elastomer material.

Due to the fact that the two shafts can move relative to one another, the linking device according to the invention allows moderate vibrations from one of the two shafts to be transmitted to the other shaft in an attenuated form. The linking device thus accomplishes a filtering of such vibrations.

Forces which are such that they cause a deformation of the layers of elastomer material by shearing indeed cause the plates of the first type to move relative to the plates of the second type. Such a movement results in a movement of one of the shafts in relation to the other shaft. These forces are therefore filtered by the linking device. The linking device therefore operates in a flexible operating mode with regard to these forces.

Conversely, when the level of forces exceeds a predetermined threshold, these forces cause the first shaft to move until it stops against at least one plate of the second type, and the second shaft to move until it stops against at least one plate of the first type. In this state, the additional forces above the abovementioned threshold are transmitted directly from one to another of the shafts by the plates.

The additional forces are not therefore filtered. The linking device then operates in a rigid operating mode.

The abovementioned plates are preferably made from a metal material.

The shafts preferably extend perpendicularly to the plates.

As a variant, each of the shafts may extend in an oblique direction relative to the plates, without going beyond the scope of the invention.

Each of the connecting units preferably includes a bushing in which the shaft of said connecting unit is installed such that it can rotate.

As a variant, the shaft of at least one of the connecting units may be directly installed such that it can rotate in the corresponding apertures of the plates. In this case, the connecting unit has no bushing, and may be formed by the abovementioned shaft.

The linking device advantageously includes means for guiding said first connecting unit along a predetermined path of movement relative to said plates of the second type, between two opposite end positions of said first connecting unit, together with means for guiding said second connecting unit along a predetermined path of movement relative to said plates of the first type, between two opposite end positions of said second connecting unit.

These guidance means enable the possible movements of the two shafts to be restricted. The filtering of the vibrations may therefore relate only to the vibrations occurring in certain directions, and not relate to vibrations occurring in other directions.

The end positions of each connecting unit are preferably defined either side of the neutral position of the connecting unit, corresponding to a non-deformed state of the layers of elastomer material.

Preferentially:

at least one of the plates of the first and/or second type(s), hereinafter called a "more rigid plate", has greater rigidity than other plates of the first and second types;

one edge of said aperture with widened section of said more rigid plate delimits said opposite end positions of the connecting unit extending through said aperture; and when this same connecting unit is located in one of its two opposite end positions, the other apertures with widened section traversed by this connecting unit extend beyond it in a direction opposite to the other of said two opposite end positions.

Since the other aperture of said more rigid plate is traversed without play by the corresponding connecting unit, as a result the end positions of this latter connecting unit are also defined by said more rigid plate.

When each of the connecting unit occupies one of their end positions under the effect of forces of a higher level than the abovementioned threshold, these connecting unit thus apply a load to said more rigid plate, but not to the other plates, such that all the forces pass through the more rigid plate.

This characteristic notably allows improved control of the mechanical behavior of the linking device when it is subject to high-level forces, and in particular enables the dimensioning of the device to be facilitated for a given application.

Furthermore, each of said apertures with widened section preferably has an elongated shape, allowing the corresponding connecting unit to be guided along said predetermined path, by the connecting unit's contact with two portions of an edge of the aperture which extend either side of the connecting unit.

The edge of each aperture with widened section thus forms part of said means of guiding the corresponding connecting unit.

Said apertures with widened section of said plates of the first and second types advantageously have a shape which is elongated in a given direction, such that said path of each of the connecting units is straight in said direction.

In a first preferred embodiment of the invention, each plate has a single first aperture and a single second aperture, and the linking device includes a single first connecting unit extending through the first aperture of each plate, and also a single second connecting unit extending through the second aperture of each plate.

The linking device according to this first embodiment may thus be used as a connecting rod, as will appear more clearly in what follows.

In a second preferred embodiment of the invention, each plate has two first apertures and two seconds apertures, and the linking device includes two first connecting units extending respectively through the two first apertures of each plate, and also two second connecting units extending respectively through the two second apertures of each plate.

In this case the first two connecting units are preferably arranged symmetrically relative to a plane orthogonal to the plates and parallel to the abovementioned direction of the path of each of the connecting units. The two second connecting units are preferentially also arranged symmetrically relative to said plane.

The linking device according to this second embodiment may thus be used as a spreader beam, as will appear more clearly in what follows.

To this end, the two second connecting units are preferably further apart than the distance between the first two connecting units.

In a third preferred embodiment of the invention:
the linking device includes a single first connecting unit and a single second connecting unit;
the linking device also includes a third connecting unit including a third shaft extending parallel to said first and second shafts;
said layers of elastomer material and said plates include respective third apertures through which said third connecting unit extends;
in each layer of elastomer material and in each of said plates, the first, second and third apertures are arranged as a triangle; and
said third connecting unit traverses without play said third apertures of said plates such that said third shaft forms a pivot for each of said plates.

Due to the fact that the plates articulated around the third shaft, the first and second connecting units are forced to describe a circular path centred on a pivot axis defined by the third shaft.

By this means the third shaft and the third apertures of the plates form said means of guiding the first and second connecting units along their respective paths.

The linking device according to this third embodiment of the invention may be used as a three-point shackle, sometimes also called a "boomerang shackle", as will appear more clearly in what follows.

In the third preferred implement of the invention said first and second apertures with widened section are preferably shaped so as to guide said first and second connecting units along their respective paths by contact with an edge of each corresponding aperture with widened section.

This characteristic is not required for the definition of said paths, due to the fact that each connecting unit is guided by the third shaft, as explained above. Nevertheless, this characteristic enables the forces passing through the third shaft to be better controlled.

The invention also relates to a propulsion system for an aircraft, including a turbine engine and a pylon to attach said turbine engine to an aircraft, characterised in that it includes at least one linking device of the type described above.

Such a propulsion system may, in particular, be added on to the fuselage of an aircraft such as an airplane, for example on one side of an aft fuselage portion.

As a variant, the propulsion system may be installed under or on an aircraft wing surface without going beyond the scope of the invention.

In particular, the propulsion system advantageously includes at least one connecting rod which is a linking device according to the first preferred embodiment of the invention, in which the first shaft is connected to said pylon, and said second shaft is connected to said turbine engine.

This linking device may thus act as a connecting rod in an engine attachment.

As a variant, or in addition, the propulsion system may include two thrust force transfer connecting rods connecting said turbine engine to said pylon, and at least one spreader beam which is a linking device according to the second preferred embodiment of the invention, in which said first shafts are connected to said pylon and said second shafts are connected respectively to said two thrust force transfer connecting rods.

This linking device may thus act as a spreader beam for transferring the thrust forces.

As a variant, or in addition, the propulsion system may include at least one three-point shackle which is a linking device according to the third embodiment, the first and third shafts of which are connected to said pylon, and the second shaft of which is connected to said turbine engine.

This linking device may thus act as a three-point shackle in an engine attachment.

Finally, the invention relates to an aircraft including at least one propulsion system of the type described above.

BRIEF DESCRIPTION OF THE DRAWINGS

The invention will be better understood, and other details, advantages and characteristics of it will appear, on reading the following description given as a non-restrictive example, with reference to the appended illustrations, in which.

In all these figures, identical references can designate identical or comparable elements.

DETAILED DESCRIPTION OF THE PREFERRED EMBODIMENTS

Figure 1:
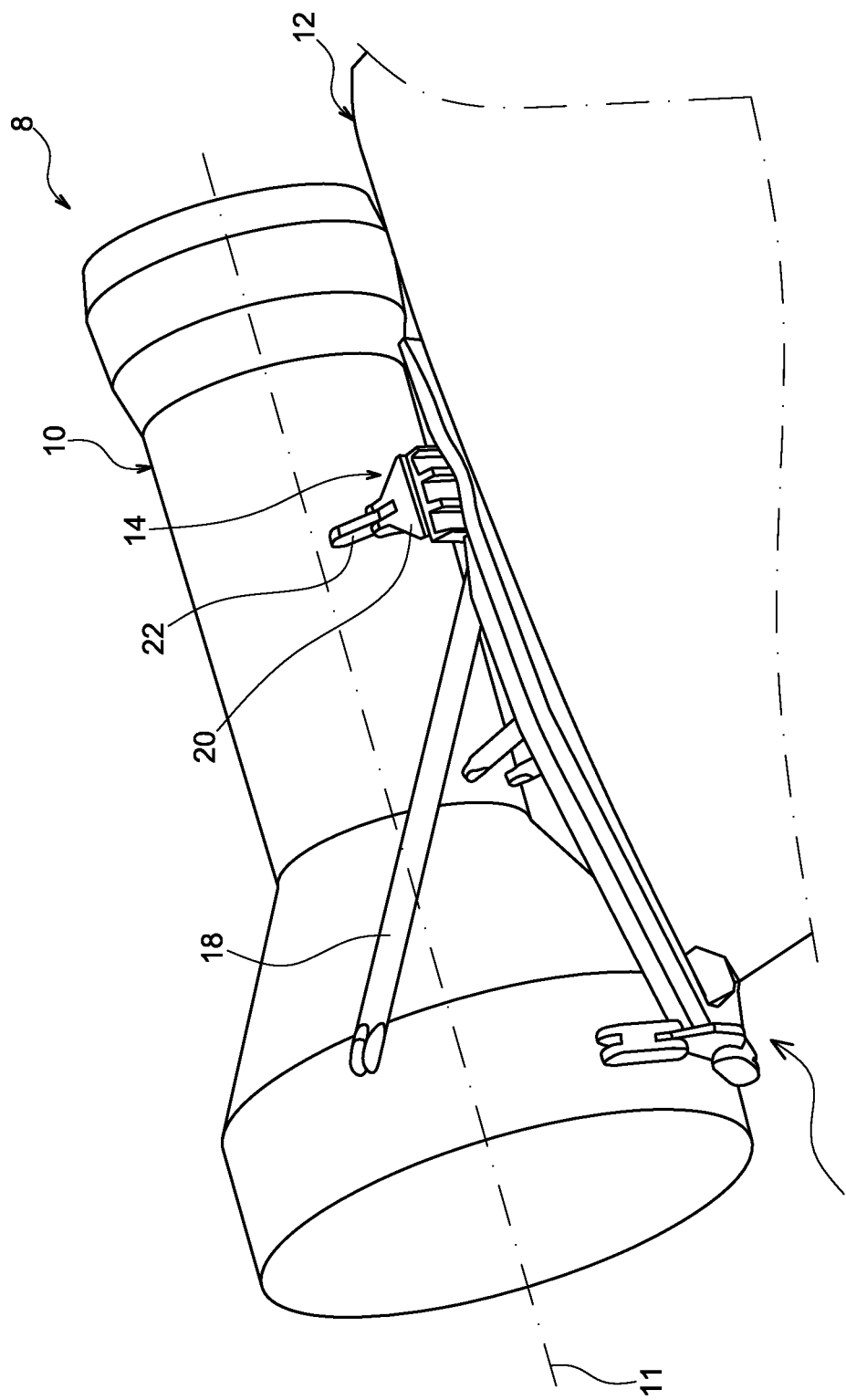
FIG. 1, which has previously been described, is a partial perspective schematic view of a propulsion system for an aircraft of a known type, including a turbine engine, a pylon, and engine attachments connecting the turbine engine to the pylon.
Figure 2:
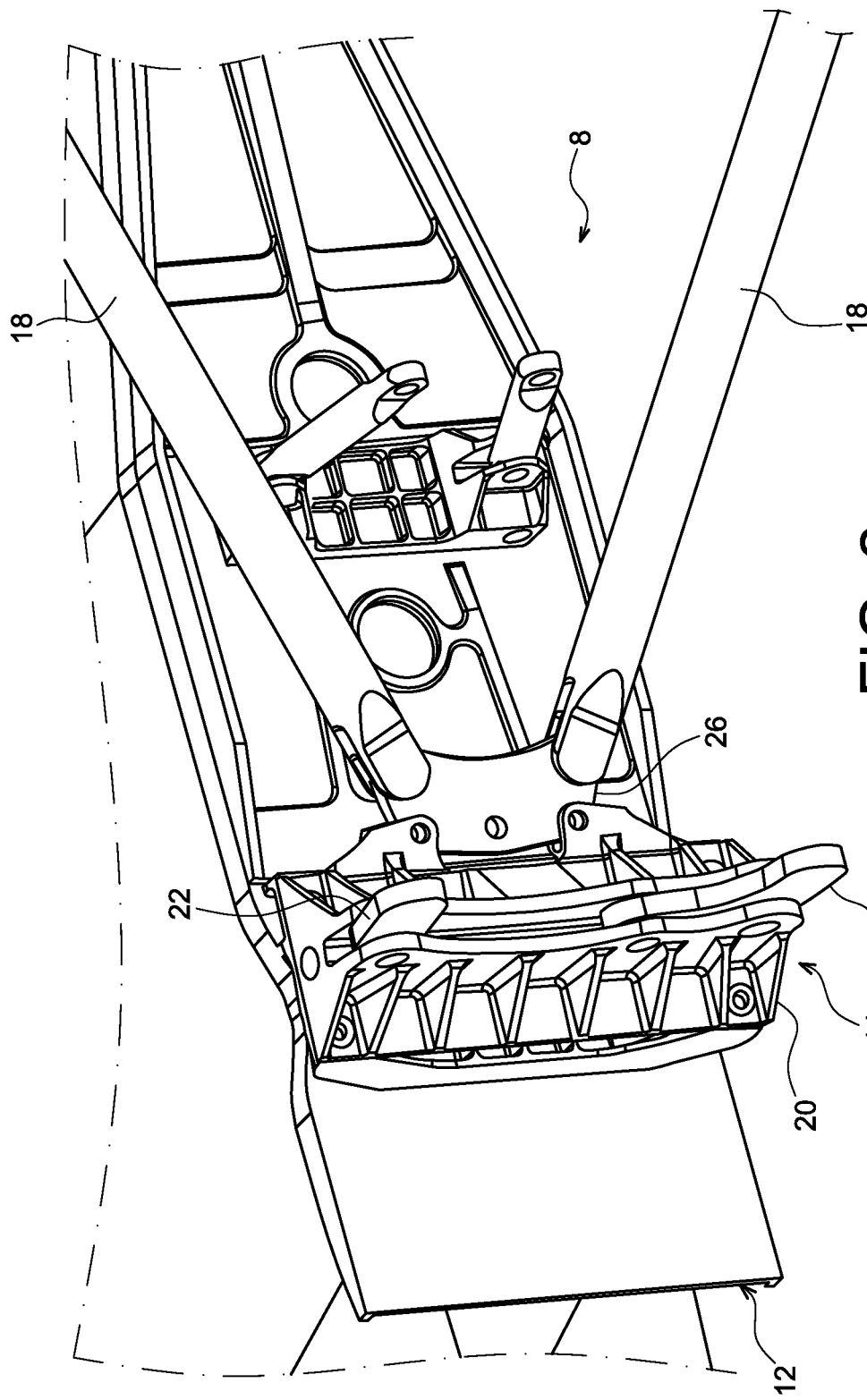
FIG. 2, which has previously been described, is a partial perspective schematic view of the pylon and of the engine attachments of the propulsion system of FIG. 1 without its turbine engine.
Figure 3:
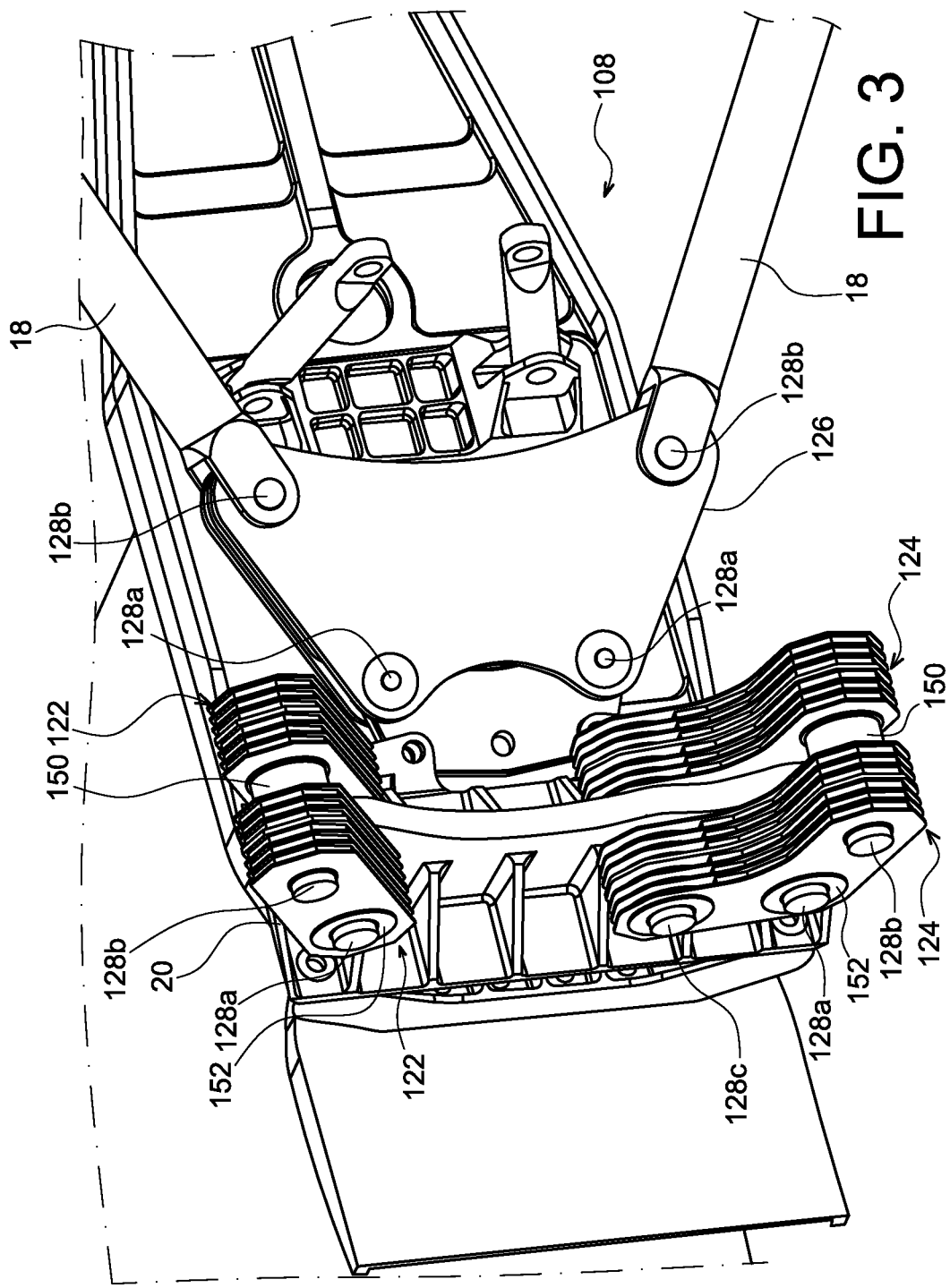
FIG. 3 is a view similar to FIG. 2, illustrating a propulsion system for an aircraft according to a preferred embodiment of the invention.

FIG. 3 illustrates a propulsion system 108 for an aircraft, which is similar to propulsion system 8 of FIGS. 1 and 2, but which includes linking devices which allow the vibrations of the turbine engine to be filtered. For reasons of clarity this turbine engine cannot be seen in FIG. 3.

Forward engine attachment 114 thus includes two connecting rods 122 and two three-point shackles 124, which have appropriate flexibility for such filtering of vibrations. The same applies to spreader beam 126, to which thrust force transfer connecting rods 18 are connected.

The two connecting rods 122 are similar and installed parallel with one another, i.e., they have the same axes, such that they provide an intrinsic safety function, also called a failsafe function, as will be shown more clearly in what follows. The same applies as regards the two three-point shackles 124.

Connecting rods 122, spreader beam 126, and shackles 124 are three linking devices according to the present invention, which will be described in succession.

Figure 4:
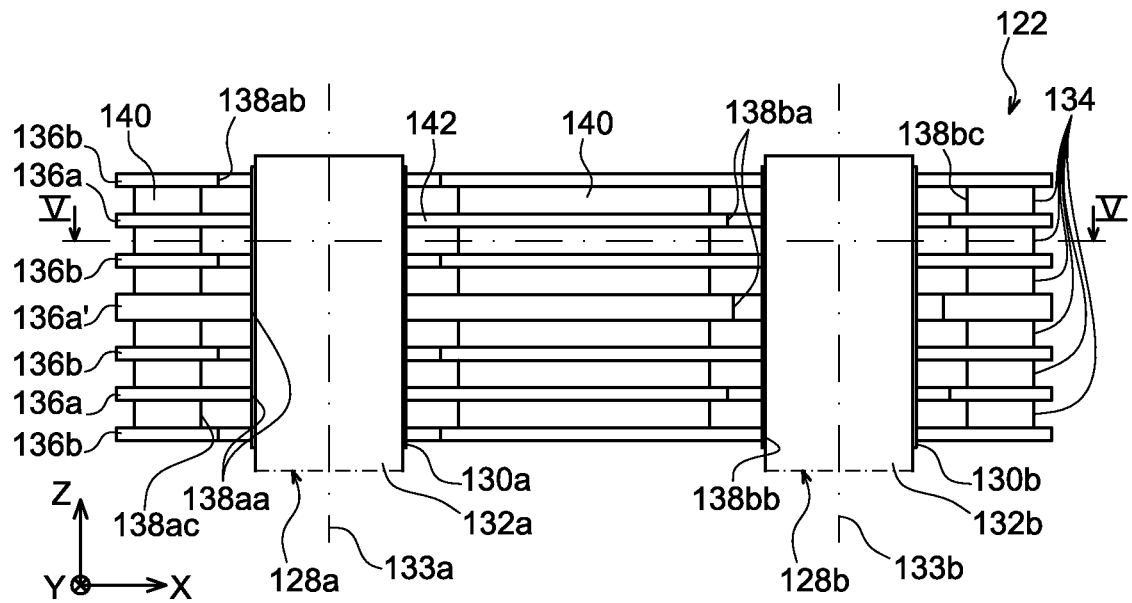
FIG. 4 is a partial lengthways section schematic view of a linking device with two shafts, of the connecting rod type, forming part of a forward engine attachment of the propulsion system of FIG. 3.
Figure 5:
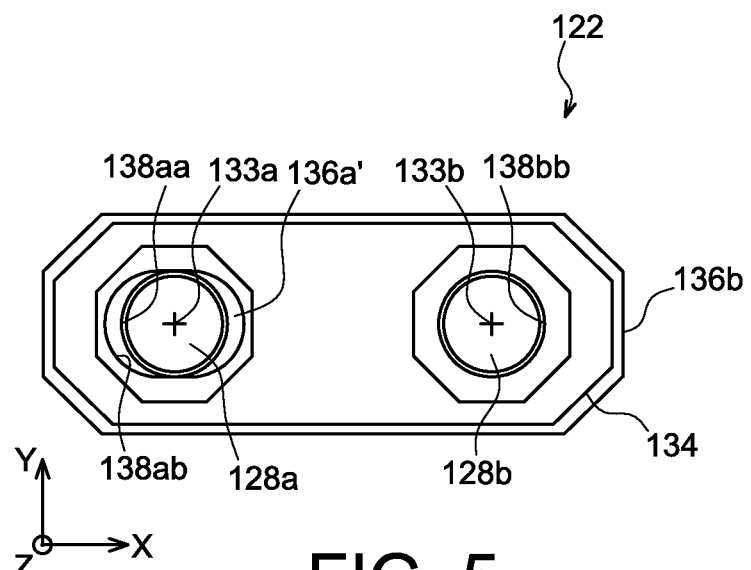
FIG. 5 is a lengthways schematic section view, in plane V-V of FIG. 4, of the linking device of FIG. 4.

FIGS. 4 and 5 illustrate one of connecting rods 122, which takes the form of a linking device including a first connecting unit 128a, a second connecting unit 128b, and connection means for connecting these connecting units 128a and 128b to one another.

In what follows, the longitudinal direction of connecting rod 122, which is its largest dimension, i.e., its length, is called X, the transverse direction of connecting rod 122, which is its width, is called Y, and the direction of the thickness of connecting rod 122 is called Z.

First connecting unit 128a is formed from a first bushing 130a having the shape of a rotating roll, and from a first shaft 132a installed pivoting in first bushing 130a around a first pivot axis 133a (FIG. 4) and connected to bracket 20 of pylon 12 (FIG. 3), for example by means of a ball joint (not visible).

Second connecting unit 128b is formed from a second bushing 130b having the shape of a rotating roll, and from a second shall 132b installed pivoting in second bushing 130b around a second pivot axis 133b (FIG. 4) and intended to be connected to the turbine engine of the propulsion system, preferably also by means of a ball joint (not visible).

Pivot axes 133a and 133b define a plane parallel to longitudinal direction X and to direction of thickness Z of connecting rod 122. It should be noted that these pivot axes extend parallel to a longitudinal axis of the turbine engine, as in the propulsion system of the known type described above with reference to FIGS. 1 and 2.

The means for connecting the connecting units to one another include a stack of layers of elastomer material 134 and of plates 136a, 136a', 136b made of a metal material, placed in alternating fashion, such that each layer of elastomer material 134 adheres to two consecutive plates (FIG. 4). These plates 136a, 136a', 136b extend in parallel to one another.

Layers of elastomer material 134 and plates 136a, 136a', 136b extend parallel to longitudinal direction X and transverse direction Y.

Layers of elastomer material 134 and plates 136a, 136a', 136b include respective first apertures 138aa, 138ab, 138ac through which first connecting unit 128a extends, and also respective second apertures 138ba, 138bb, 138bc through which second connecting unit 128b extends.

The plates are divided into plates of a first type 136a, 136a', and into plates of a second type 136b, arranged in alternating fashion.

Respective first apertures 138aa of plates of the first type 136a, 136a' are circular in shape. First bushing 130a is installed securely through these first apertures 138aa. First bushing 130a is therefore coupled to each plate of the first type 136a, 136a'. First connecting unit 128a thus traverses without play these first apertures 138aa of the plates of the first type.

Respective second apertures 138bb of plates of the second type 136b are circular in shape. Second bushing 130b is installed securely through these second apertures 138bb. Second bushing 130b is therefore coupled to each plate of the second type 136b. Second connecting unit 128b thus traverses without play these second apertures 138bb of the plates of the second type.

In what follows all the above mentioned apertures 138aa and 138bb will be designated by the term "adjusted apertures".

Respective first apertures 138ab of plates of the second type 136b and respective second apertures 138ba of plates of the first type 136a, 136a' have respective sections of a shape which is elongated in longitudinal direction X. The section of respective first apertures 138ab of plates of the second type 136b is thus widened compared to the section of first apertures 138aa of plates of the first type 136a. Similarly, the section of respective second apertures 138ba of plates of the first type 136a, 136a' is widened compared to the section of second apertures 138bb of plates of the second type 136b.

In what follows all these apertures 138ab and 138ba will be designated by the term "apertures with widened section".

It must be understood that a portion of the edge of each of these apertures with widened section 138ab and 138ba extends at some distance from corresponding connecting unit 128a, 128b when this device is in a neutral position, corresponding to a non-deformed state of layers of elastomer material 134.

More precisely, these apertures with widened section have, for example, the shape of an elongated circle centered on corresponding pivot axis 133a, 133b (FIG. 5). Such a shape may be obtained by connecting two identical concave half-circles by two identical line segments parallel to a median axis of the half-circles.

For each of these apertures with widened section 138ab, 138ba, both the half-circles in question have a radius of curvature identical to the radius of curvature of adjusted apertures 138aa, 138bb traversed by same connecting unit 128a, 128b.

The two abovementioned line segments are thus separated from one another by a distance equal to the diameter of the corresponding adjusted apertures. These two line segments thus form two portions of an edge of the aperture which are in contact with corresponding connecting unit 128a, 128b.

In the illustrated example it should be noted that the two connecting units 128a, 128b are similar, such that the first and second adjusted apertures are similar to one another, and that the first and second apertures with widened section are also similar to one another. This is of course not the case when both connecting units 128a, 128b are of different conformations.

In addition, apertures 138*ac*, 138*bc* of layers of elastomer material 134 have respective sections which are widened compared to all the corresponding apertures of plates 136*a*, 136*a'*, 136*b*, as is shown in FIGS. 4 and 5.

The projection of first aperture 138*ac* of each layer of elastomer material 134 in the direction of first pivot axis 133*a* thus fully encapsulates first aperture 138*aa*, 138*ab* of each of plates 136*a*, 136*a'*, 136*b*. Comparably, the projection of first aperture 138*bc* of each layer of elastomer material 134 in the direction of second pivot axis 133*b* thus fully encapsulates second aperture 138*ba*, 138*bb* of each of plates 136*a*, 136*a'*, 136*b*.

In the illustrated example, one plate 136*a'* among the plates of the first type includes a second aperture 138*ba* having a less elongated section than respective second apertures with widened section 138*ba* of other plates of the first type 136*a* (FIG. 4).

In addition, abovementioned plate 136*a'* is thicker than the other plates 136*a*, 136*b*. Plate 136*a'* is thus more rigid than the other plates.

In addition, in FIGS. 4 and 5, connecting rod 122 is represented in a resting condition, in which no load is applied to layers of elastomer material 134.

In this resting condition each aperture with widened section 138*ab*, 138*ba* is centred relative to corresponding pivot axis 133*a*, 133*b* (FIG. 4).

Each connecting unit 128*a*, 128*b* is thus in a neutral position, at some distance from the opposite longitudinal ends of each aperture with widened section 138*ab*, 138*ba* which is traversed by the connecting unit. This neutral position is, for example, defined at an equal distance from the opposite longitudinal ends of each aperture with widened section 138*ab*, 138*ba* which is traversed by the connecting unit.

Figure 6:
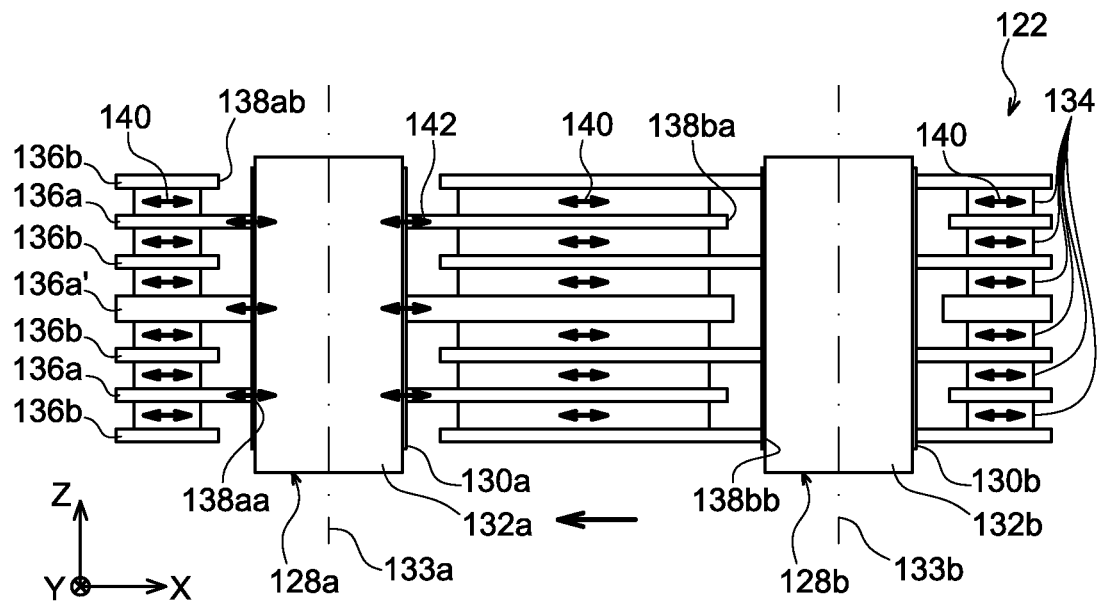
FIGS. 6 to 8 are schematic diagrams illustrating the linking device of FIG. 4, respectively when in a resting condition, when subject to compression forces, and when subject to traction forces.
Figure 7:
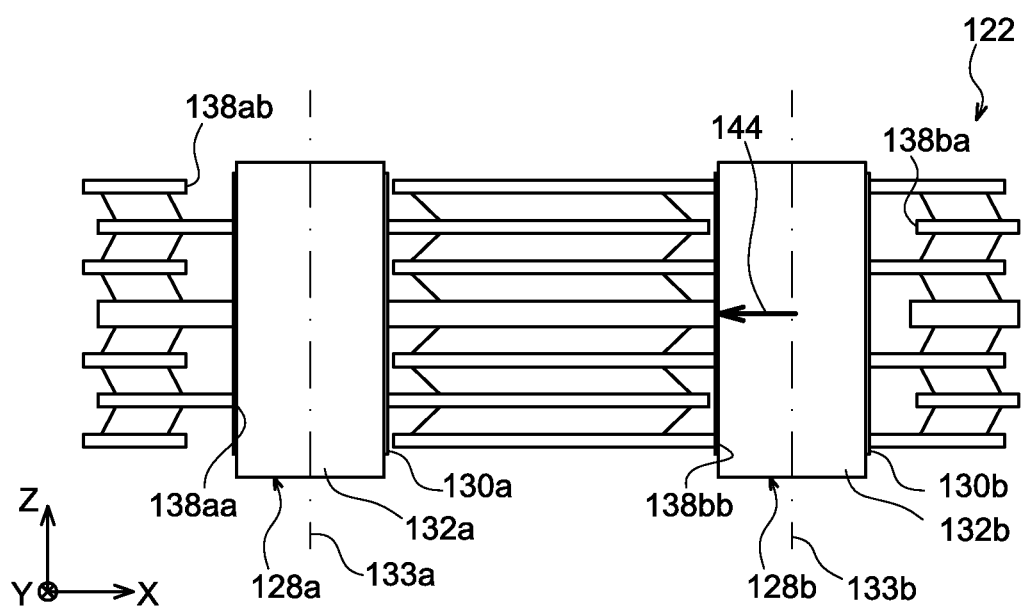
Figure 8:
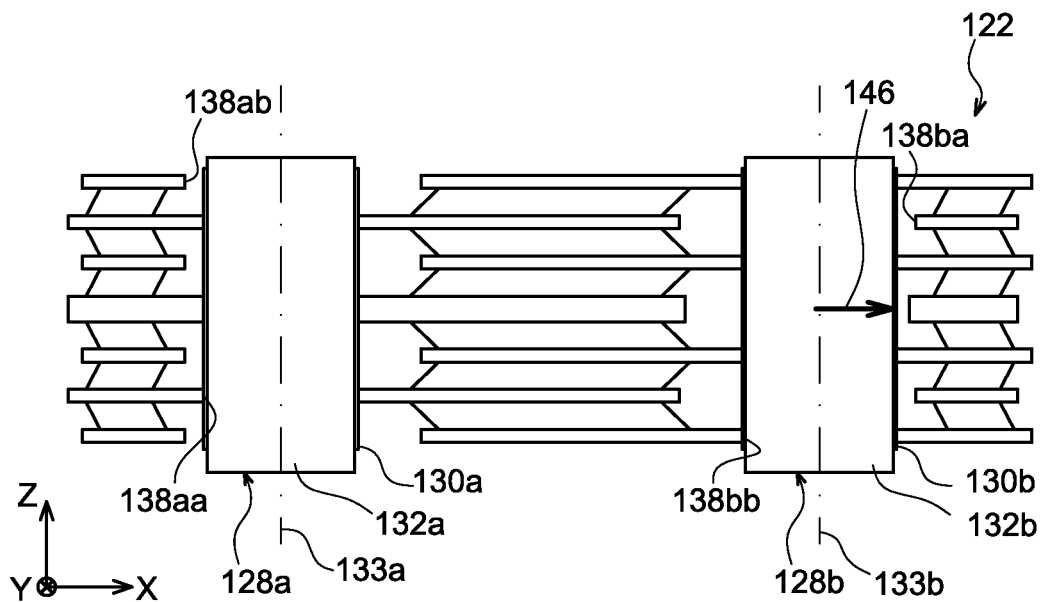

FIGS. 6 to 8 illustrate schematically the operation of connecting rod 122.

FIG. 6 illustrates a flexible operating mode of connecting rod 122, and represents this connecting rod 122 in its resting condition, also represented in FIG. 4.

The forces which result from vibrations of the turbine engine, and which are directed in longitudinal direction X of connecting rod 122, apply a load to second shaft 132*b* of this connecting rod.

This second shaft 132*b* transmits these forces to plates of the second type 136*b*, which are coupled to second bushing 130*b*.

These latter plates 136*b* transmit these forces to layers of elastomer material 134, as illustrated by double arrows 140 of FIG. 6.

In their turn, layers of elastomer material 134 transmit these forces to plates of the first type 136*a*.

In their turn, these transmit these forces to first bushings 130*a* and therefore to first shaft 132*a* (double arrows 142).

The transmission of the forces to layers of elastomer material 134 causes a shearing deformation of these layers, the amplitude of which depends on the intensity of the forces.

Depending on the direction of the forces, this deformation of layers of elastomer material 134 causes connecting units 128*a*, 128*b* either to come closer together or to move farther apart, from their respective positions corresponding to the neutral state of connecting rod 122. The conformation of apertures with widened section 138*ab*, 138*ba* allows, indeed, the two connecting units 128*a*, 128*b* to move relative to one another in longitudinal direction X of connecting rod 122, by means of a corresponding movement of plates of the second type 136*b* relative to plates of the first type 136*a*, 136*a'*.

The threes are then consequently transmitted in an attenuated form to plates of the first type 136*a* and to first shaft 132*a*.

Connecting rod 122 thus accomplishes a filtering of these forces.

Connecting rod 122 operates according to this flexible operating mode for as long as the level of the forces applied to the connecting rod remains below or equal to a predetermined threshold, defined as being the level of forces at which second bushing 130*b* comes to a stop against one of the longitudinal ends of second aperture 138*ba* of the more rigid plate 136*a'* of the first type.

FIG. 7 thus illustrates the maximum closeness of the two connecting units 128*a*, 128*b*, caused by the compression forces of connecting rod 122, i.e., forces applied to second shaft 132*b* and occurring in the direction of first shaft 132*a* (arrow 144).

Conversely, FIG. 8 illustrates the maximum separation of the two connecting units 128*a*, 128*b*, caused by traction forces of connecting rod 122, i.e., forces applied to second shaft 132*b* and occurring in the direction opposite to first shaft 132*a* (arrow 146).

In both cases, the additional forces over the abovementioned threshold are transmitted to more rigid plate 136*a'*, and therefore to first bushing 130*a* which is coupled to it. Indeed, second bushing 130*b*, whilst being stopped against a longitudinal end of second aperture 138*ba* of more rigid plate 136*a'*, remains separated from the corresponding longitudinal end of second apertures 138*ba* of other plates of the first type 136*a*. Connecting rod 122 does not therefore accomplish any filtering above the abovementioned threshold. Connecting rod 122 thus operates in a rigid operating mode above this threshold.

It should be noted that in the state illustrated in FIG. 7 second connecting unit 128*b* is in a first end position relative to plates of the first type 136*a*, 136*a'*, whereas first connecting unit 128*a* is in a first end position relative to plates of the second type 136*b*.

In a comparable manner, in the state illustrated in FIG. 8 second connecting unit 128*b* is in a second end position relative to plates of the first type 136*a*, 136*a'*, whereas first connecting unit 128*a* is in a second end position relative to plates of the second type 136*b*.

The first and second end positions of the connecting units are thus determined by more rigid plate 136*a'*.

In the flexible operating mode each of connecting units 128*a*, 128*b* moves between its two end positions without reaching them, being guided along a path defined by the shape of the apertures with widened section 138*ab* 138*ba* which are traversed by the connecting unit. Each connecting unit is, indeed, guided by the contact of bushing 130*a*, 130*b* of the connecting unit with the line segment portions of the edge of each aperture with widened section 138*ab*, 138*ba* which is traversed by the connecting unit.

Figure 9:
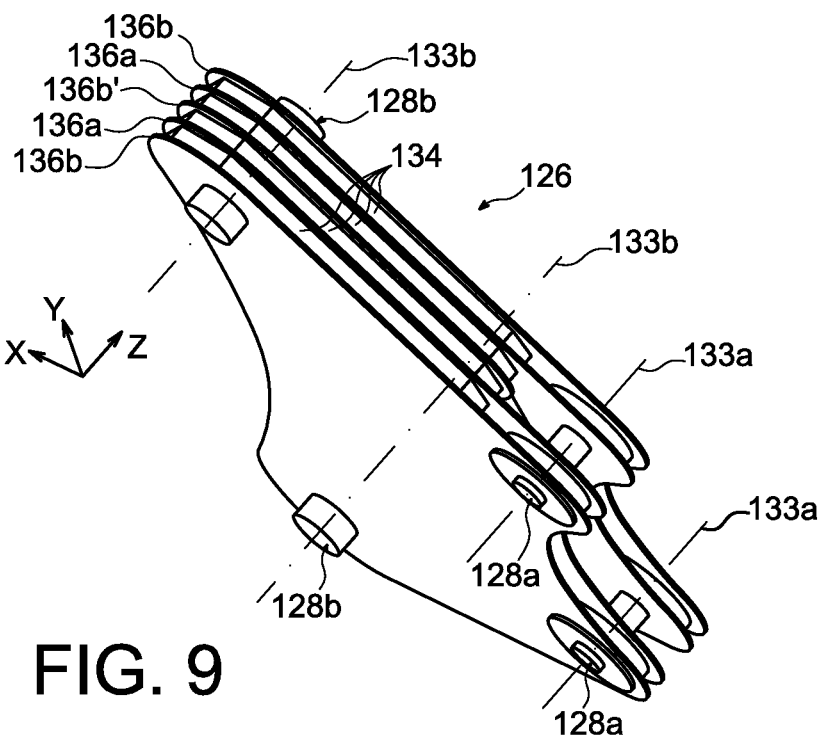
FIG. 9 is a perspective schematic view of a linking device with four shafts, of the spreader beam type for transferring thrust forces, forming part of the propulsion system of FIG. 3, but represented isolated in FIG. 9.
Figure 10:
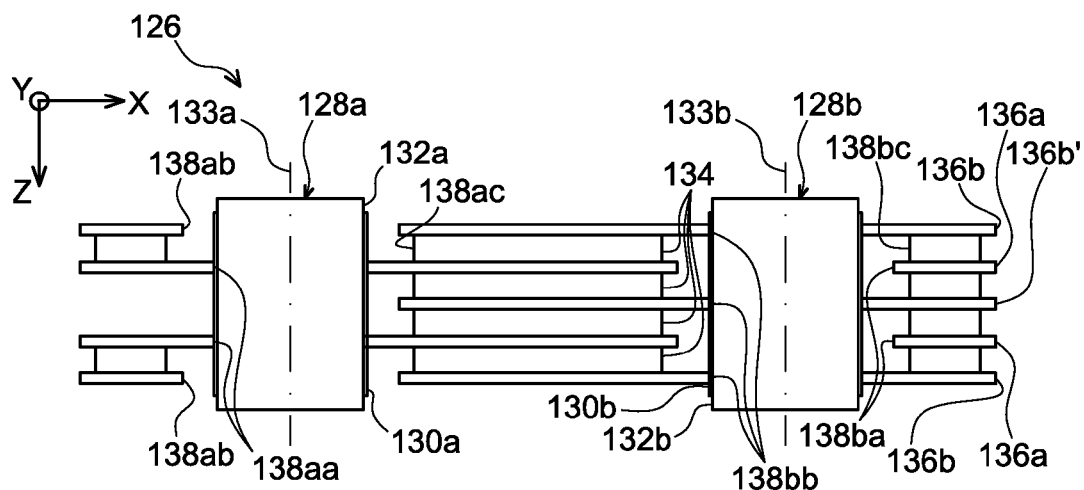
FIG. 10 is a schematic view similar to FIG. 6, illustrating the linking device of FIG. 9 as a section of plane X-X of FIG. 11.
Figure 11:
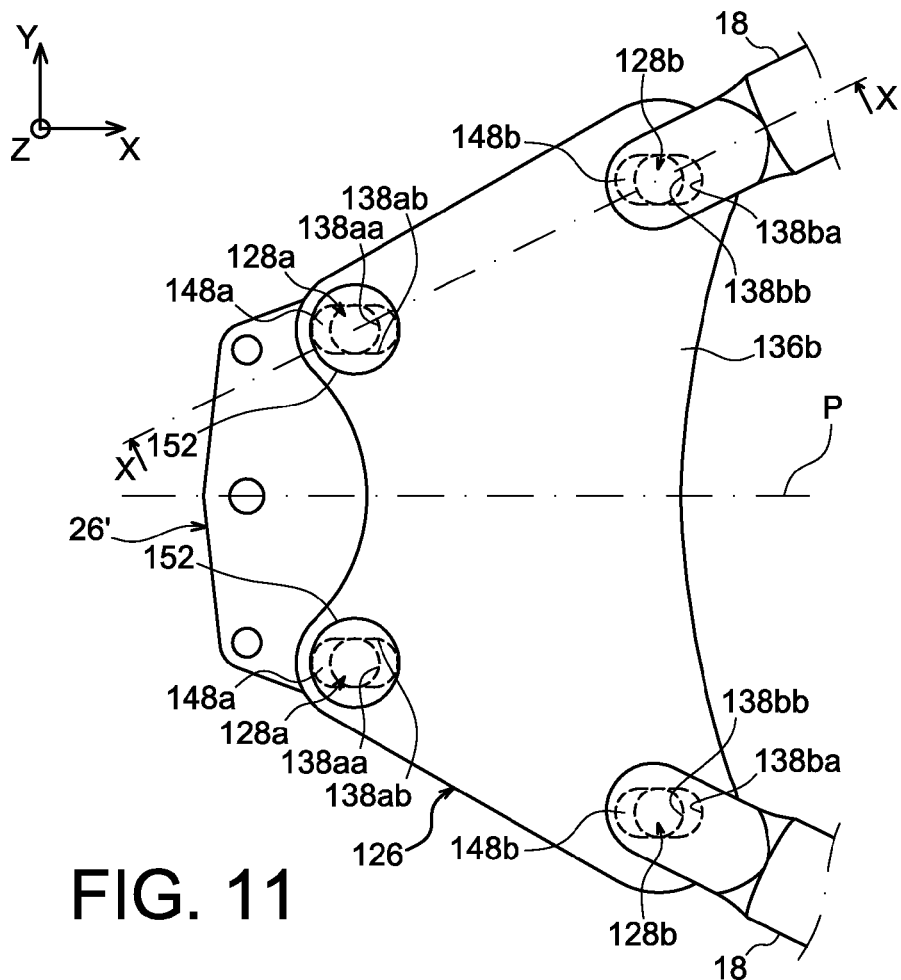
FIG. 11 is a partial schematic view of the propulsion system of FIG. 3, illustrating the linking device of FIG. 9 seen from the front.

FIGS. 9 to 11 illustrate spreader beam 126. It includes two first connecting units 128*a*, two second connecting units 128*b*, and means for connecting these connecting units 128*a*, 128*b* to one another.

In what follows the longitudinal direction is called X, the transverse direction is called Y, and the direction of the thickness of spreader beam 126 is called Z.

First connecting units 128*a* of spreader beam 126 are similar to the first connecting unit of connecting rod 122 described above. Their respective first shafts 132*a* are connected to a rigid secondary spreader beam 26', which is itself connected to bracket 20 of pylon 12 (FIG. 3), Second connecting units 128*b* of spreader beam 126 are similar to the second connecting unit of connecting rod 122 described above. Their respective second shafts 132b are connected respectively to two thrust force transfer connecting rods 18 (FIGS. 3, 10 and 11).

Pivot axes 133a and 133b extend parallel to direction of thickness Z of spreader beam 126 (FIGS. 9 and 10). The two first pivot axes 133a define a first plane parallel to transverse direction Y and to direction of thickness Z, while the two second pivot axes 133a define a second plane parallel to transverse direction Y and to direction of thickness Z.

The two first connecting units 128a are positioned symmetrically relative to a median plane P of spreader beam 126 (FIG. 11). The same applies in respect of the two second connecting units 128b. Median plane P extends parallel to longitudinal direction X and to direction of thickness Z of spreader beam 126.

In addition, the two second connecting units 128b are further apart from one another than the distance separating the two first connecting units 128a.

The connection means which connect the connecting units to one another are comparable to those of connecting rod 122 described above, and thus include a stack of layers of elastomer material 134 and of plates 136a, 136b, 136b' made of a metal material, placed in alternating fashion, such that each layer of elastomer material 134 adheres to two consecutive plates (FIG. 9).

Layers of elastomer material 134 and plates 136a, 136b, 1.36b' extend parallel to longitudinal direction X and to transverse direction Y, and each includes two respective first apertures 138aa, 138ab, 138ac through which the two first connecting units 128a extend, and also two respective second apertures 138ba, 138bb, 138bc through which the two second connecting units 128b extend.

The plates are divided into plates of a first type 136a, and into plates of a second type 136b, 136b', arranged in alternating fashion.

Respective first apertures 138aa of plates of the first type 136a are circular in shape (FIG. 11). Each first bushing 130a is installed securely through corresponding first apertures 138aa (FIG. 10). Each first connecting unit 128a thus traverses without play corresponding first apertures 138aa of the plates of the first type.

Comparably, respective second apertures 138bb of plates of the second type 136b, 136b' are circular in shape. Each second bushing 130b is installed securely through corresponding second apertures 138bb. Each second connecting unit 128b thus traverses without play corresponding second apertures 138bb of the plates of the second type.

Respective first apertures 138ab of plates of the second type 136b and respective second apertures 138ba of plates of the first type 136a have respective sections of elongated shape in longitudinal direction X (FIG. 11) similar to the section of the apertures with widened section of connecting rod 122 described above.

In addition, apertures 138ac, 138bc of layers of elastomer material 134 have respective sections which are widened (FIG. 10) compared to all the corresponding apertures of plates 136a, 136b, 136b', as in the case of connecting rod 122.

In the illustrated example, one plate 136b' among the plates of the second type has no first aperture, and stops short of first two connecting units 128a (FIGS. 9 and 10). This enables rigid secondary spreader beam 26' to be installed as an extension of abovementioned plate 136b', passing first two connecting units 128a through corresponding apertures of secondary rigid spreader beam 26'.

As a variant, spreader beam 126 may be directly connected to bracket 20 of forward engine attachment 114 (FIG. 3), in which case propulsion system 108 has no rigid secondary spreader beam 26'. In this case all the plates of the second type may be similar, hi particular, all these plates may have two first apertures 138ba.

The operation of spreader beam 126 is globally comparable to that of connecting rod 122. Spreader beam 126 thus enables the longitudinal component of the forces applied by two thrust force transfer connecting rods 18 to he filtered.

Such filtering results in a movement of each second connecting unit 128b along a path 148b (FIG. 11) relative to plates of the first type 136a, and therefore relative to rigid secondary spreader beam 26' and to bracket 20 coupled to pylon 12.

The movement of second connecting units 128b results in a movement of each first connecting unit 128a along a path 148a relative to plates of the second type 136b, 136b' which are coupled to connecting rods 18.

The component of the forces occurring in transverse direction Y is transmitted directly to first bushing 130a, and therefore to first shaft 132a, by plates of the second type 136b, 136b'. This results from the contact of first bushing 130a with the line segment portions of the edge of each first aperture with widened section 138ab, and from the contact of second bushing 130b with the line segment portions of the edge of each second aperture with widened section 138ba.

The spreader beam has a flexible operating mode and a rigid operating mode comparable to the operating modes of connecting rod 122.

However the operation of spreader beam 126 differs from that of connecting rod 122 in that both end positions of each connecting unit 128a, 128b are defined by all plates 136a, 136b.

As a variant, spreader beam 126 may however include a more rigid plate comparable to more rigid plate 136a' of connecting rod 122 defining the end positions of the connecting units.

Figure 12:
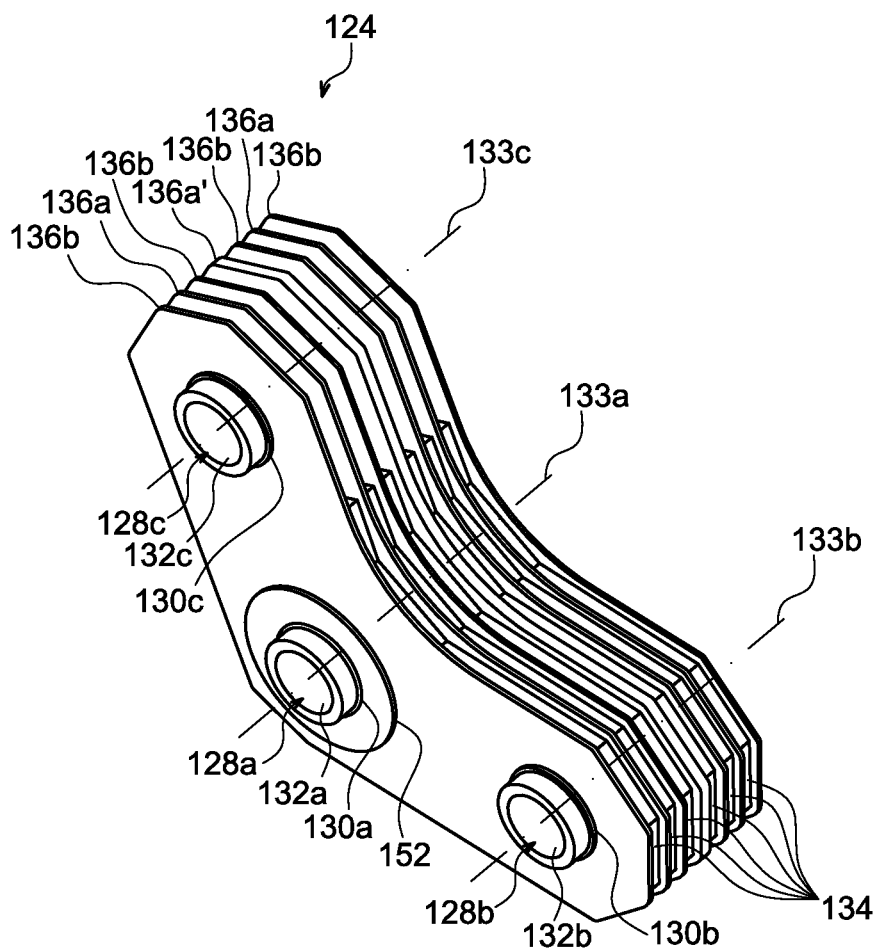
FIG. 12 is a perspective schematic view of a linking device with three shafts, of the three-point shackle type, forming part of the forward engine attachment of the propulsion system of FIG. 3, but represented isolated in FIG. 12.
Figure 13:
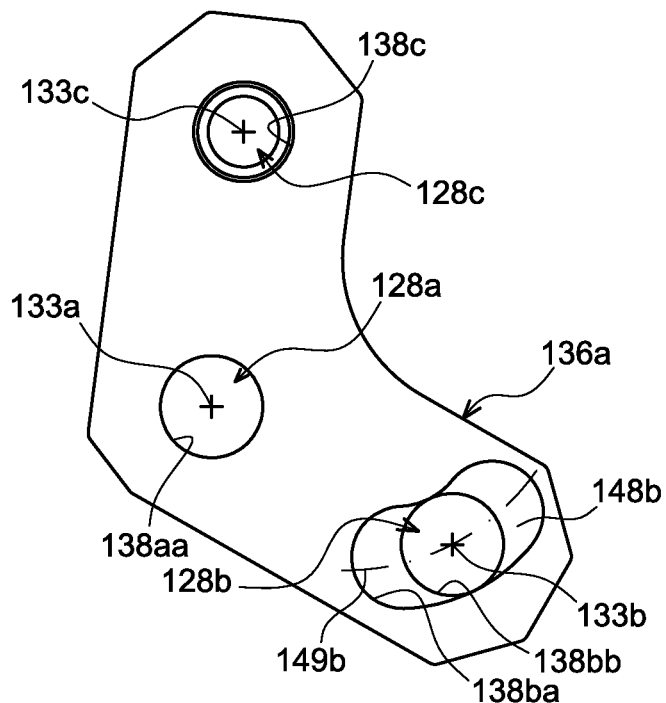
FIGS. 13 and 14 are schematic views of the linking device of FIG. 12, as a section of the respective median planes of plates respectively of a first type and of a second type forming part of this linking device.
Figure 14:
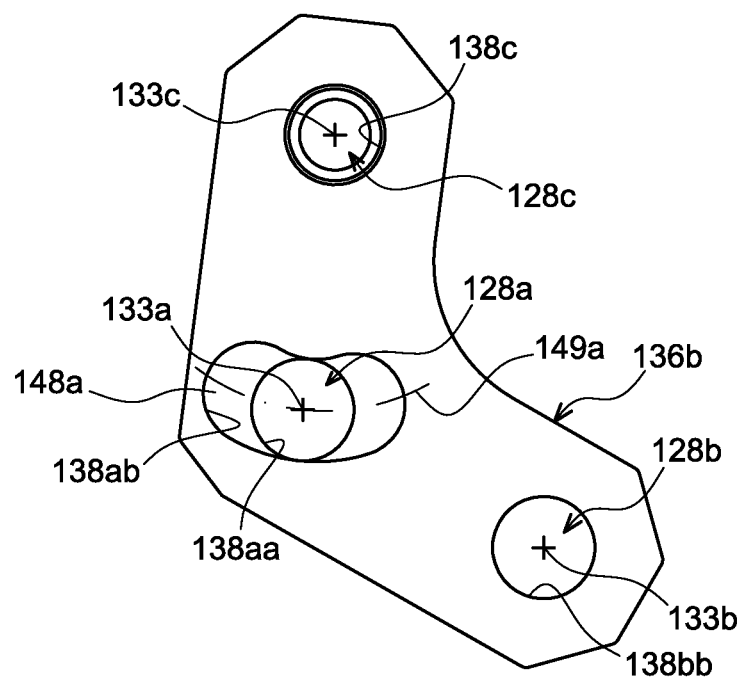

FIGS. 12 to 14 illustrate one of the two three-point shackles 124. It includes a first connecting unit 128a, a second connecting unit 128b, a third connecting unit 128c, and connection means for connecting these connecting units 128a, 128b, 128c to one another.

In what follows, a direction leading from first connecting unit 128a to second connecting unit 128b is called longitudinal direction X, the direction of the thickness of shackle 124 is called direction Z, and the direction orthogonal to the previous two directions is called transverse direction Y.

First connecting unit 128a of shackle 124 is similar to the first connecting unit of connecting rod 122 described above. First shaft 132a is installed in bracket 20 of pylon 12 (FIG. 3).

Second connecting unit 128b of shackle 124 (FIG. 12) is similar to the second connecting unit of connecting rod 122. Second shaft 132b is intended to be connected to the turbine engine of the propulsion system.

Third connecting unit 128c of shackle 124 is similar to its first connecting unit 128a, and thus includes a third bushing 130c having the shape of a rotating roller and a third shaft 132c installed pivoting in third bushing 130c around a third pivot axis 133c, and also installed in bracket 20 of pylon 12 (FIG. 3).

Pivot axes 133a, 133b and 133c extend parallel to direction of thickness Z of shackle 124 (FIG. 12). Longitudinal direction X is defined such that first and second pivot axes 133a, 133b define a plane parallel to said longitudinal direction X. Third pivot axis 133c is separated from the abovementioned plane. The three connecting units are consequently arranged as a triangle.

The connection means which connect the connecting units to one another include a stack of layers of elastomer material 134 and of plates 136a, 136a', 136b made of a metal material, placed in alternating fashion, such that each layer of elastomer material 134 adheres to two consecutive plates (FIG. 12).

Layers of elastomer material 134 and plates 136a, 136a', 136b extend parallel to longitudinal direction X and transverse direction Y, and include respective first apertures 138aa, 138ab (FIGS. 13 and 14) through which first connecting unit 128a extends, together with respective second apertures 138ba, 138bb through which second connecting unit 128b extends, in a manner comparable to that which was described above in relation to connecting rod 122.

The general shape of plates 136a, 136a', 136b has two portions forming an obtuse angle.

Layers of elastomer material 134 stop short of third connecting unit 128c, for example roughly halfway between first and third axes 133a, 133c, as is shown in FIG. 12.

Plates 136a, 136a', 136b also include respective third apertures 138c through which third connecting unit 128c extends. Bushing 130c of this device is installed securely through these third apertures 138c. This bushing 130c is therefore coupled to each of plates 136a, 136a, 136b, such that third shaft 132c forms a pivot for each of these plates.

The plates are divided into plates of a first type 136a, 136a', and into plates of a second type 136b, arranged in alternating fashion.

Respective first apertures 138aa of plates of the first type 136a, 136a' are circular in shape (FIG. 13). First bushing 130a is installed securely through these first apertures 138aa. First connecting unit 128a thus traverses said first apertures 138aa without play.

Respective second apertures 138bb of plates of the second type 136b are circular in shape (FIG. 14). Second bushing 130b is installed securely through these second apertures 138bb. Second connecting unit 128a thus traverses said second apertures 138aa without play.

The two respective apertures 138ba of plates of the first type 136a, 136a' (FIG. 13) have a widened section allowing second connecting unit 128b to move, relative to these plates of the first type 136a, 136a', along a path 148b, the general shape of which is a portion of a circle 149b centred on third axis 133c. As an example, said second apertures 138ba have a bean shape.

In a comparable manner, respective first apertures 138ab of plates of the second type 136b (FIG. 14) have a widened section allowing first connecting unit 128a to move, relative to these plates of the second type 136b, along a path 148a, the general shape of which is a portion of a circle 149a centred on third axis 133c. As an example, said first apertures 138ab also have a bean shape.

Such a bean shape enables the edges of the aperture to help guide the corresponding connecting unit.

As a variant, these apertures may have any shape with a sufficiently wide section to allow the corresponding connecting unit to move along its path 148a, 148b. Indeed, the guiding of the connecting units is intrinsically provided by the pivotal connection of each of the plates of both types 136a, 136a', 136b to third axis 133c.

In addition, the apertures of layers of elastomer material 134 have respective sections which are widened compared to all the corresponding first and second apertures of plates 136a, 136a', 136b, as in connecting rod 122.

In the illustrated example, one plate 136a' among the plates of the first type includes a second aperture 138ba having a less elongated section than respective second apertures with widened section 138ba of other plates of the first type 136a, as in connecting rod 122. In addition, abovementioned plate 136a' is thicker than that of other plates 136a, 136b. Plate 136a' is thus more rigid than the other plates. This more rigid plate 136a' in this case also enables the end positions of first and second connecting units 128a, 128b to be defined.

The operation of three-point shackle 124 is globally similar to that of connecting rod 122.

This shackle 124 indeed enables forces applied to second connecting unit 128b resulting from vibrations of the turbine engine to be filtered, by means of a shearing deformation of layers of elastomer material 124 and, consequently, movement of plates of the second type 136b relative to plates of the first type 136a, 136a', rotating around third axis 133c.

The component of the forces concerned by this filtering is thus tangential to circle 149b, passing through second axis 133b and centred on third axis 133c (FIG. 13).

Shackle 124 has a flexible operating mode and a rigid operating mode comparable to the operating modes of connecting rod 122.

In the illustrated example the transition between these two operating modes is determined by more rigid plate 136a', as explained above with regard to connecting rod 122.

More generally, in the three linking devices described above, formed respectively by connecting rod 122, three-point shackle 124, and spreader beam 126, the presence of a plate 136a' having greater rigidity than the other plates is optional.

Such a plate enables all the forces to be transferred, in the rigid operating mode of the linking device.

This enables understanding and the control of the mechanical properties of the linking device to be facilitated when the latter is subjected to the most intense forces.

In addition, in linking devices 122, 124, 126 described above, the apertures with widened section are centred relative to the neutral position occupied by the connecting unit which traverses them when the linking device is in resting condition.

However, when it is desirable to filter the forces occurring in one direction to a greater extent than the forces occurring in the opposite direction, the shape of the apertures with widened section may be modified accordingly, and no longer be centered relative to the neutral position of the corresponding connecting unit.

In addition, bushings 130a, 130b and axes 132a, 132b, 132c are manufactured from a metal material, such as a superalloy of the INCONEL (registered trademark) range, for example the alloy called "INCONEL 718" (registered trademark).

The plates are manufactured, for example, from titanium or from a superalloy of the INCONEL, (registered trademark) range.

The adhesion of layers of elastomer material 134 to the plates results from the vulcanisation of the elastomer. To this end, depending on the material of the plates, it may be advantageous to cover the plates beforehand with a coating facilitating the adhesion of the elastomer.

To facilitate the manufacture of the device, each layer of elastomer material has an edge which is recessed relative to the edge of the plates to which said layer adheres.

It is also possible for the connecting units to have no bushings, without going beyond the scope of the invention.

In addition, in the linking device according to the invention, the section of first and second shafts 132a, 132b within the linking device is not necessarily circular. Indeed, all types of section allowing relative movement of the plates of the first and second types are possible.

Thus, in the special case in which the path of a connecting unit is straight, as in connecting unit 122 and in spreader beam 126, the shaft may, for example, have a polygonal section.

This shaft may then possibly he fitted with a bushing or a bearing outside the linking device to allow a pivotal connection of the linking device to an element to be connected to it.

In addition, in the linking device according to the invention, the relative movement of connecting units 128*a* and 128*b* occurs parallel to plates 136*a*, 136*b*.

However, to this end, it is not necessary for the connecting units to extend orthogonally to the plates. It is thus possible for these connecting units to extend obliquely relative to the plates, without going beyond the scope of the invention.

It should be noted that the manner in which the linking devices described above are connected to the turbine engine may be conventional, and will not he described in detail.

As illustrated by FIG. 3, the two connecting rods 122 have common first and second shafts 132*a*, 132*b*. Each of these shafts is fitted with a bearing 150 arranged between the two connecting rods 122 to provide the pivotal connection of the shafts to bracket 20, and to the turbine engine, respectively.

The same applies in relation to three-point shackle 124, the three shafts of which are thus fitted with bearings.

In addition, first bushing 130*a* of each connecting rod 122 and of each shackle 124 includes two protective washers 152 which are applied respectively on to the respective outer faces of two plates of the second type 136*b* positioned at the ends of the corresponding stack of plates.

These protective washers 152 are sufficiently extensive to cover fully corresponding first aperture with widened section 138*ab*, whatever the position of first connecting unit 128*a* along its path. These protective washers 152 thus enable the intrusion of dust or water within connecting rods 122 and shackles 124 to be prevented.

The two first bushings 130*a* of spreader beam 126 are also fitted with such protective washers 152 (FIG. 11).

It should also be noted that the two connecting rods 122 are preferably dimensioned such that each connecting rod 122 is able to operate alone if other connecting rod 122 fails. The two connecting rods 122 thus form a redundant system, of the type commonly called a "failsafe" system.

The same applies in regard to three-point shackles 124.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A linking device including:
at least one first connecting unit including a first shaft;
at least one second connecting unit including a second shaft; and
connection means for connecting said connecting units to one another;
wherein
said connection means include a stack of layers of elastomer material and of plates made of a more rigid material placed in alternating fashion, such that each layer of elastomer material adheres to two consecutive plates of said stack, wherein said plates extend in parallel to one another;
said layers of elastomer material and said plates include respective first apertures through which the first connecting unit extends, and also respective second apertures through which the second connecting unit extends;
the projection of the first aperture of each layer of elastomer material, in the direction of said first shaft, fully encapsulates said first aperture of each of said plates;
the projection of the second aperture of each layer of elastomer material, in the direction of said second shaft, fully encapsulates said second aperture of each of said plates;
said plates include plates of two distinct types, positioned in alternating fashion;
said first aperture of each plate of a first of the two said distinct types is shaped such that said first connecting unit traverses this aperture without any play;
said second aperture of each plate of a second of the two said distinct types is shaped such that said second connecting unit traverses this aperture without any play;
the section of said respective first apertures of the plates of the second type is widened compared to the section of the respective first apertures of the plates of the first type, and the section of said respective second apertures of the plates of the first type is widened compared to the section of the respective second apertures of the plates of the second type, such that said first and second shafts can move relative to one another, in parallel to said plates, by means of a shearing deformation of said layers of elastomer material.

2. A linking device according to claim 1, including:
means for guiding said first connecting unit along a predetermined path of movement relative to said plates of the second type, between two opposite end positions of said first connecting unit, and
means for guiding said second connecting unit along a predetermined path of movement relative to said plates of the first type, between two opposite end positions of said second connecting unit.

3. A linking device according to claim 2, wherein,
at least one of the plates of the first and second types, hereinafter called a "more rigid plate", has greater rigidity than other plates of the first and second types;
one edge of said aperture with a widened section of said more rigid plate delimits said opposite end positions of the connecting unit extending through said aperture; and
when this same connecting unit is located in one of its two opposite end positions, the other apertures with widened section traversed by this connecting unit extend beyond it in a direction opposite to the other of said two opposite end positions.

4. A linking device according to claim 2, in which each of said apertures with widened section has an elongated shape, allowing the corresponding connecting unit to be guided along said predetermined path, by the connecting unit's contact with two portions of an edge of the aperture which extend either side of the connecting unit.

5. A linking device according to claim 4, wherein apertures with widened section of said plates of the first and second types have an elongated shape in the same direction, such that said path of each of the connecting units is straight in said direction.

6. A linking device according to claim 2, wherein:
the linking device includes a single first connecting unit and a single second connecting unit;
the linking device also includes a third connecting unit including a third shaft extending parallel to said first and second shafts;
said layers of elastomer material and said plates include respective third apertures through which said third connecting unit extends;

in each layer of elastomer material and in each of said plates, the first, second and third apertures are arranged as a triangle; and said third connecting unit traverses without play said third apertures of said plates such that said third shaft forms a pivot for each of said plates.

7. A propulsion system for an aircraft, including a turbine engine together with a pylon to attach said turbine engine to an aircraft, further including at least one three-point shackle which is a linking device according to claim 6, wherein said first and third shafts of said three-point shackle are connected to said pylon, and said second shaft of said three-point shackle is connected to said turbine engine.

8. A propulsion system for an aircraft, including a turbine engine together with a pylon to attach said turbine engine to an aircraft, and at least one linking device according to claim 1.

9. An aircraft comprising at least one propulsion system according to claim 8.

10. A propulsion system for an aircraft, including a turbine engine together with a pylon to attach said turbine engine to an aircraft, and further including at least one connecting rod which is a linking device according to claim 1, in which each of said plates includes a single first aperture and a single second aperture, where said connecting rod includes:

a single first connecting unit which extends through the first aperture of each plate, wherein the first shaft of said first connecting unit is connected to said pylon, and a single second connecting unit which extends through the second aperture of each plate, wherein the second shaft of said second connecting unit is connected to said turbine engine.

11. A propulsion system for an aircraft, including a turbine engine together with a pylon to attach said turbine engine to an aircraft, as well as two thrust force transmission connecting rods connecting said turbine engine to said pylon, and further including at least one spreader beam which is a linking device according to claim 1, in which each of said plates includes two first apertures and two second apertures, where said spreader beam includes:

two first connecting units which extend respectively through the two first apertures of each plate, wherein the respective first shafts of said first connecting units are connected to said pylon, and two second connecting units extending respectively through the two second apertures of each plate, wherein the respective second shafts of said second connecting units are connected respectively to said two thrust force transmission connecting rods.

\* \* \* \* \*